United States Patent [19]

Kanzaki

[11] 4,448,523

[45] May 15, 1984

[54] SUBASSEMBLY WITHDRAWING DEVICE IN A COPYING MACHINE

[75] Inventor: Michio Kanzaki, Kanagawa, Japan

[73] Assignee: Fuji Xerox Co., Ltd., Tokyo, Japan

[21] Appl. No.: 365,689

[22] Filed: Apr. 5, 1982

[30] Foreign Application Priority Data

Aug. 4, 1981 [JP] Japan ................................ 56-121435

[51] Int. Cl.[3] ................................................ G03B 29/00

[52] U.S. Cl. .............................. 355/133; 312/341 NR

[58] Field of Search ............ 355/133, 3 DR; 352/104; 312/334, 341, 341 NR; 271/117

[56] References Cited

U.S. PATENT DOCUMENTS

| | | | |
|---|---|---|---|
| 3,582,199 | 6/1971 | Barr | 352/104 |
| 4,076,409 | 2/1978 | Hamaguchi et al. | 355/133 X |
| 4,231,566 | 11/1980 | Suzuki | 271/117 |
| 4,331,369 | 5/1982 | Lazar et al. | 312/341 NR |

*Primary Examiner*—Richard A. Wintercorn

*Attorney, Agent, or Firm*—Sughrue, Mion, Zinn, Macpeak, and Seas

[57] ABSTRACT

A subassembly withdrawing device in a copying machine has first and second L-shaped subassembly supporting brackets. The first subassembly supporting bracket is fixedly secured to a subassembly and is releasably engaged with the second subassembly supporting bracket by a screw and a pair of guide pins. The guide pins are fixedly secured to the second subassembly supporting bracket and pass through elongated holes in a face of the first subassembly supporting bracket. When it is desired to work on the subassembly, the first and second subassembly supporting brackets are extended from the copying machine to the maximum extent possible. When it is desired to further remove the subassembly from the copying machine, the screw is removed and the first subassembly supporting bracket is moved relative to the second subassembly supporting bracket along the length defined by the length of the elongated holes.

5 Claims, 2 Drawing Figures

SUBASSEMBLY WITHDRAWING DEVICE IN A COPYING MACHINE

BACKGROUND OF THE INVENTION

1. Field of the Invention

The present invention relates to an improvement of a device for withdrawing a subassembly of a copying machine..

2. Description of the Prior Art

In a conventional device for withdrawing a subassembly of a copying machine, the amount of withdrawal of the subassembly is determined by the stroke of rails used. Therefore, with reference to FIG. 1 in the case where maintenance work is carried out after a subassembly 02 is pulled out of a copying machine body 01 with the aid of rails 04 with a handle 03 to provide an access space $L_1$, the rails 04 are required to have a length $L_1+L_2$. Accordingly, when the subassembly 02 is put back in the copying machine 01, the rails 04 partially protrude from the back side of the copying machine body 01. Alternatively, the copying machine body can have a space for accommodating the subassembly which is large enough to receive the subassembly and avoid the protrusion of the rails from the back side of the copying machine body.

In the former case, holes must be cut in the rear surface of the copying machine body. Therefore, the space for the installation of the copying machine is considerably increased. On the other hand, in the latter case where the volume of the copying machine body is increased to accommodate the extra length of the rails 04, the space $L_1$ is completely unnecessary during the ordinary operation of the copying machine. This extra space causes various factors which may make the operation of the copying machine unstable because of the structural arrangement of the copying machine. Thus, the latter case also creates problems.

SUMMARY OF THE INVENTION

Accordingly, an object of the present invention is to provide a subassembly withdrawing device that solves the problems noted above.

Specifically, in accordance with the present invention, first and second subassembly supporting members are connected at adjacent faces thereof by a pair of guide pins, which extend from the adjacent face of the second subassembly supporting member and pass through elongated holes in the adjacent face of the first subassembly supporting member. The first and second subassembly supporting members are also connected together by a screw. When it is desired to remove the subassembly from the copying machine, the first and second subassembly supporting members, connected by the screw, are moved out from the copying machine with the aid of subassembly-withdrawing rail members. When additional space is required to work on the subassembly, the screw is removed so that the first subassembly supporting member can be moved relative to the second subassembly supporting member along the length defined by the elongated holes.

DESCRIPTION OF THE PREFERRED EMBODIMENTS

Figure 2:
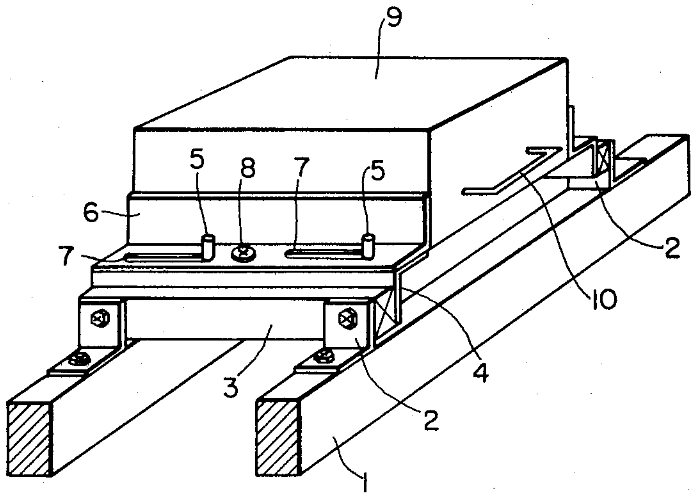
FIG. 2 is a perspective view showing a subassembly withdrawing device in accordance with one embodiment of the invention.

Referring to FIG. 2, a pair of base frames 1 are provided in a copying machine body. Two L-shaped brackets 2 are secured to each base frame 1 with screws. Rails 3 are mounted on the vertical portions of the brackets 2 with screws in such a manner that the rails 3 extend across the base frames 1. The rails 3, mounted on the brackets 2, each have two rail members, one of which is movable relative to the other. A subassembly supporting bracket 4, which is L-shaped in section, is secured to the one rail member with a screw in such a manner that the bracket 4 is extended longitudinally of the one rail member. Furthermore, subassembly supporting bracket 6 are fixedly secured to both sides of a subassembly 9. The subassembly supporting brackets 6 can be extended in the direction of withdrawal of the subassembly 9. Two guide pins 5 are protruded from the upper surface of each bracket 4 in such a manner that they are arranged in a longitudinal line. The two guide pins 5 are engaged with two elongated holes 7 which are cut in the horizontal portion of the brackets 6, respectively. When the subassembly 9 is put in the copying machine body, the guide pins 5 abut against the outer ends of the elongated holes 7. The brackets 4 and 6 are fixedly coupled to each other by a screw 8 when the guide pins 5 abut against the outer ends of the elongated holes 7.

Figure 1:
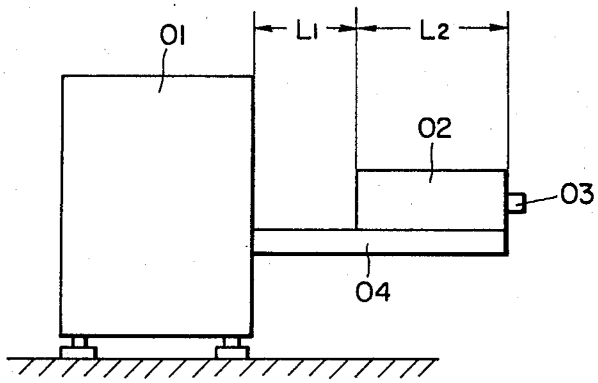
FIG. 1 PRIOR ART
FIG. 1 is a side view of a prior art subassembly withdrawing device which is pulled out of a copying machine.

When the subassembly withdrawing device according to the invention is constructed as shown in FIG. 2, the operator can perform ordinary work after he pulls the subassembly 9 fully forwards (corresponding to the distance $L_2$ in FIG. 1) with a handle 10. When it is required to further pull out the subassembly, for instance, for replacement of parts, the subassembly 9 can be pulled out as much as the length of the elongated holes 7 in the brackets 6 (corresponding to the distance $L_1$ in FIG. 1) by pulling the handle 10 forwards after the screws 8 have been removed.

After necessary maintenance work has been accomplished, the subassembly 9 can be put back in the copying machine body as follows: The subassembly 9 is pushed back, and then the brackets 4 and 6 are secured to each other with the screws 8. When this is accomplished, the subassembly 9 is further pushed back.

As is clear from the above-described embodiment of the invention, the stroke for withdrawing the subassembly can be changed as required and, therefore, maintenance work can be achieved readily. Therefore, no useless space is created in the copying machine body.

I claim:

1. A subassembly withdrawing device for a copying machine, comprising:

a first subassembly supporting member fixedly secured to a subassembly in said copying machine;

a second subassembly supporting member fixedly secured to subassembly-withdrawing rail members;

fixing means operating only to fixedly interconnect said first and second subassembly supporting members so that said first and second subassembly supporting members are movable together, said fixing means being removable; and separate means for movably guiding said first and second members relative to one another so that said first and second members are movable a predetermined distance relative to each other when said fixing means is removed from said first and second members.

2. The subassembly withdrawing device as claimed in claim 1 wherein said first and second subassembly supporting members comprise first and second L-shaped supporting brackets, said first subassembly supporting bracket having elongated holes in a face thereof connected to a corresponding face of said second subassembly supporting bracket, said fixing means comprising a screw which passes through apertures in said connected faces of said first and second subassembly supporting brackets, said guide means comprising guide pins which are connected to said connected face of said second subassembly bracket, said guide pins passing through said elongated holes in said connected face of said first subassembly supporting bracket.

3. The subassembly withdrawing device as claimed in claim 2 wherein said first subassembly supporting bracket is movable relative to said second subassembly supporting bracket upon removal of said screw over a length defined by a length of said elongated holes.

4. The subassembly withdrawing device as claimed in claim 3 wherein two pairs of said first and second subassembly supporting brackets are provided, each pair of said first and second subassembly brackets being connected by two guide pins and one screw.

5. The subassembly withdrawing device as claimed in claim 1 wherein said means for movably guiding said first and second members relative to one another comprises a pair of pin and slot connections provided on either side of said subassembly, said fixing means being centrally located between said pair of pin and slot connections.

* * * * *